(12) United States Patent
Shoval et al.

(10) Patent No.: US 8,370,899 B2
(45) Date of Patent: Feb. 5, 2013

(54) DISPOSABLE BROWSER FOR COMMERCIAL BANKING

(75) Inventors: Asaf Shoval, Rishon Le-Zion (IL); Orit Yaron, Herzeliya (IL); Yedidya Dotan, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 253 days.

(21) Appl. No.: 12/854,641

(22) Filed: Aug. 11, 2010

(65) Prior Publication Data

US 2012/0042365 A1    Feb. 16, 2012

(51) Int. Cl.
*H04L 9/32* (2006.01)

(52) U.S. Cl. ..................... 726/2; 726/3; 726/4

(58) Field of Classification Search .................. 726/2–7, 726/12–15; 713/150, 168–171; 705/64, 705/70; 709/227–228
See application file for complete search history.

(56) References Cited

U.S. PATENT DOCUMENTS

| | | | |
|---|---|---|---|
| 7,246,174 B2* | 7/2007 | Sciandra et al. | 709/244 |
| 8,010,679 B2* | 8/2011 | Low et al. | 709/227 |
| 2005/0273849 A1 | 12/2005 | Araujo et al. | |
| 2007/0174915 A1 | 7/2007 | Gribble et al. | |
| 2009/0070595 A1 | 3/2009 | Delia et al. | |
| 2009/0182803 A1 | 7/2009 | Barton et al. | |
| 2010/0115023 A1 | 5/2010 | Peled | |
| 2010/0199276 A1* | 8/2010 | Umbehocker | 718/1 |

OTHER PUBLICATIONS

Jammalamadaka, Ravi Chandra et al., "Delegate: A Proxy Based Architecture for Secure Website Access from an untrusted Machine", Proceedings of the 22nd Annual Computer Security Applications Conference (ACSAC '06), 2006, 10 pages.
International Search Report from PCT/US2011/047448, mailed Nov. 8, 2011.

* cited by examiner

*Primary Examiner* — Hosuk Song
(74) *Attorney, Agent, or Firm* — BainwoodHuang (57) ABSTRACT

Methods, computer program products, and apparatuses are provided for performing and facilitating secure communication between a client-side computing device and a remote application server through a virtual computing environment provided by an intermediate virtualization server. The virtual computing environment includes a disposable component, allowing all settings to be initialized to a secure state after each user session.

15 Claims, 6 Drawing Sheets

DISPOSABLE BROWSER FOR COMMERCIAL BANKING

BACKGROUND

Malicious software (malware) is currently a serious threat to both commercial and retail online banking. As many as one in four computers in the US is infected by malware. Moreover, the value of lost records may be about $215 per record.

The malware most relevant to online banking fraud are of the Trojan horse variety (Trojans). These install themselves on user machines and then may enable a controller to record data from an infected machine (e.g., key loggers), listen in on conversations (e.g., Man in The Middle or MiTM), or even hijack an HTTP session from within a browser (e.g., Man in The Browser or MiTB).

Trojans, as their name implies, are not perceived by the user. They are able to record keyboard entries at given web sites, and thereby steal the users' userIDs and passwords. They are also able to change transactions as they occur, thus the user may think he is performing a legitimate transaction (e.g., paying a bill) but in reality he is sending money to an offshore account. Trojans also allow session hijacking, whereby a remote fraudster performs transactions via the user's infected machine.

SUMMARY

This invisible presence allows Trojans to circumvent most, if not all, current strong authentication models (e.g. one time passwords and certain out of band interactions). In particular, it may be possible for a fraudster to use Trojans both to steal credentials and clean out accounts. For example, in a MiTB attack, a fraudster may use a key logger to steal the user identifier and the confidential password from a bank and hijack the individual's account by secretly altering user transactions while presenting fictitious transaction confirmation data to the user. Furthermore, the fraudster may take over user's account and clean out his checking account.

In contrast to conventional online banking environments that may include strong authentication methods, various embodiments involve working from a secure virtual environment, taking the form of a disposable browser environment, preventing direct interaction between the malware and the online banking site. Additionally, such secure virtual solution may involve behavioral analysis of the particular user's sessions (e.g. purchase habits, the user's unique click stream, the user's banking patterns and other user specific activities). One may choose to add other solutions available to the systems such as an adaptive authentication server that may be able to evaluate potential risks of fraud (i.e., generate risk scores which assess the risk of fraudsters) and provide input back to the bank to allow the bank to take action (e.g., contact the user, temporarily deny or disable access to the user's account, and so on). In particular, such operation protects users from identity theft and misuse of credit information.

Some embodiments are directed to a method of authenticating a user of a bank attempting to download the client interface to the disposable browser environment. These embodiments may include using strong authentication methods such as out-of-band phone calls to enable the downloading of the interface.

Additionally, some embodiments are directed to a secure login process, which includes an authentication server (e.g. adaptive authentication server) which authenticates users of a banking site. In some arrangements, the bank may also provide a site key or authenticate itself to the user by providing a predefined phrase or image. Furthermore, in some arrangements, the bank is able to communicate with the user using out-of-band communications such as a phone call, an email, a text message, a short message service (SMS) communication, etc.

Furthermore, some embodiments are directed to a computer program product including a tangible computer readable storage medium storing instructions which cause a computer to operate as the adaptive authentication server. In some arrangements, the instructions are compiled and linked executable code. In other arrangements, the instructions are scripts or rules which are dynamically translated and then performed by the computer.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Described herein are various embodiments that relate to techniques for performing and facilitating secure communication between a client-side computing device and a remote application server through a virtual computing environment provided by an intermediate virtualization server. The virtual computing environment includes a disposable component, allowing all settings to be initialized to a secure state after each user session. In one embodiment, the application server is a web banking server and the secured communications relate to commercial banking transactions.

Figure 1:
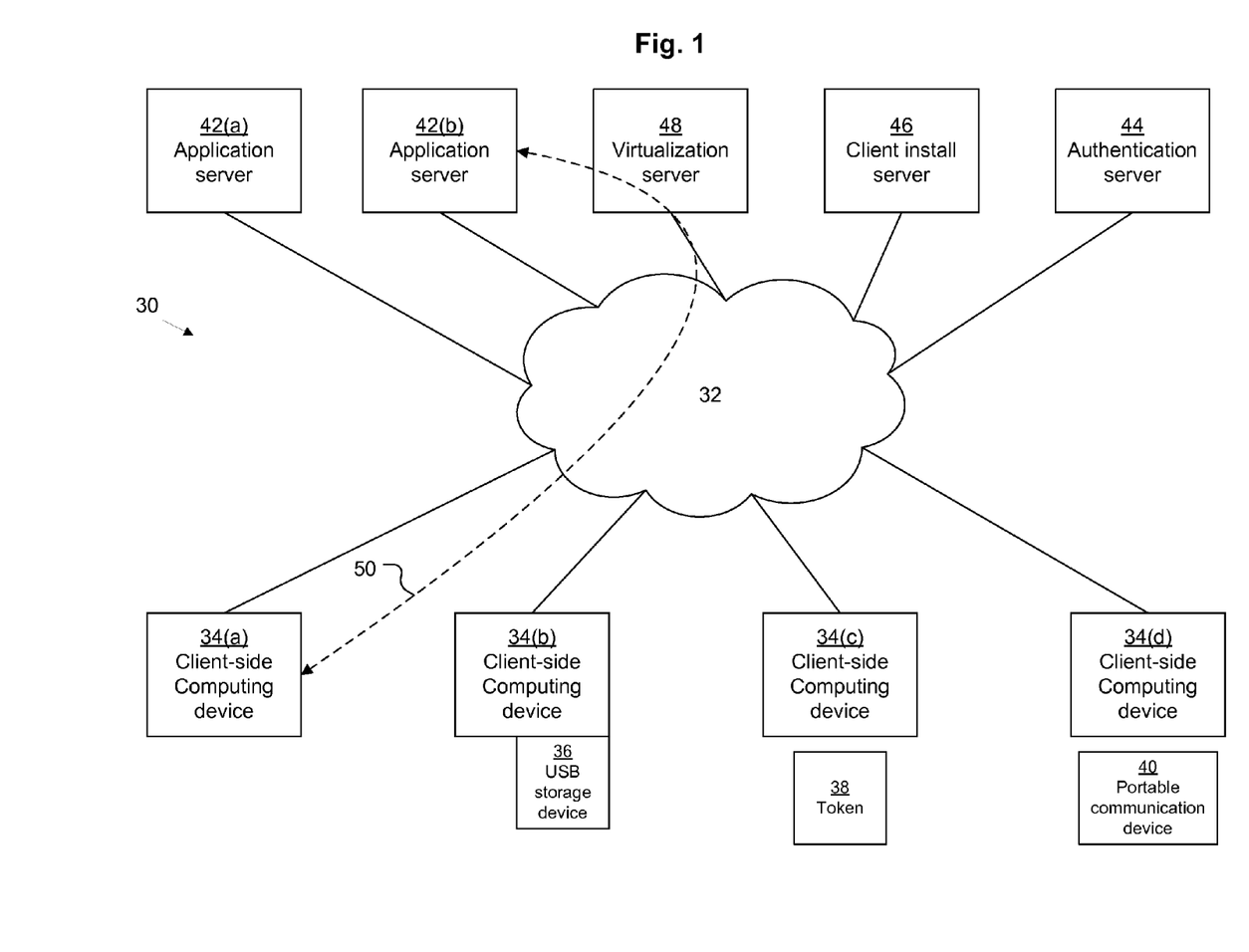
FIG. 1 illustrates an example system for use in practicing various embodiments.

FIG. 1 illustrates a system 30 for use in conjunction with various embodiments. System 30 includes a network 32 (such as, for example, the Internet). System 30 also includes a set of client-side computing devices (CSCDs) 34, depicted as CSCDs 34(a)-34(d), that are connected to the network 32. CSCDs 34 may be, for example, personal computers or web-enabled tablets or telephones. Some CSCDs 34, such as CSCD 34(b), attach to a small external portable storage device such as a Universal Serial Bus (USB) "thumb drive" or storage device 36. A user of a CSCD 34, such as CSCD 34(c), may hold a token device 38. A user of a CSCD 34, such as CSCD 34(d), may hold a portable communication device 40, such as a cellular phone.

Network 32 also connects to one or more application servers 42, depicted as application servers 42(a)-42(b), an authentication server 44, a client install server 46, and a virtualization server 48. It should be understood that although exactly one each is shown of the authentication server 44, client install server 46, and virtualization server 48, in some embodiments there may be multiple instances of each, while in other embodiments, some of these elements may be omitted. Furthermore, some of these elements may be replaced with various combinations of other devices that perform similar tasks.

In one example mode of operation, a CSCD 34(*a*) may establish a virtual session running on virtualization server 48 to allow for secured communications 50 between CSCD 34(*a*) and an application server 42(*b*) via the virtualization server 48.

Figure 2:
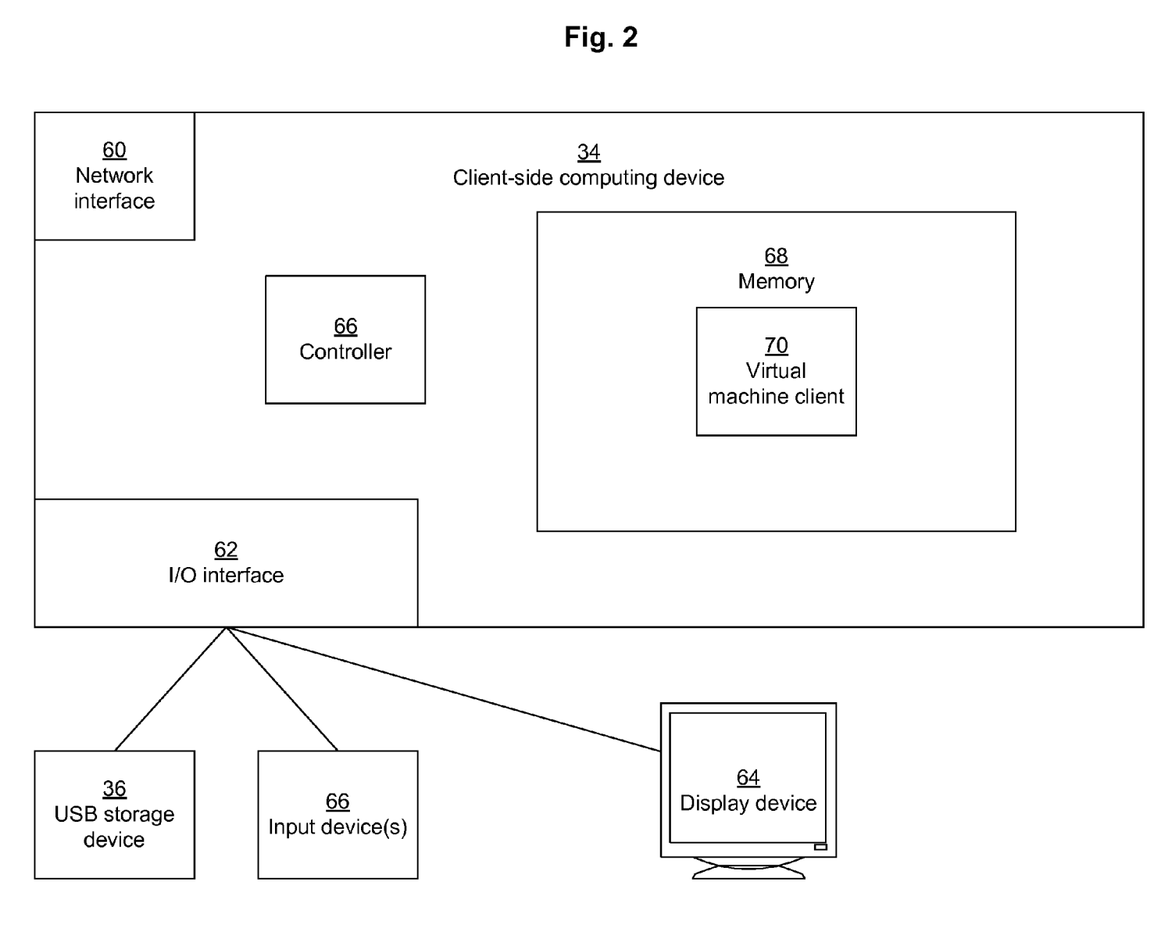
FIG. 2 illustrates an example apparatus of one embodiment.

FIG. 2 depicts a CSCD 34 in further detail. A CSCD 34 is typically a user terminal having a unique and tamper-proof DeviceID. CSCD 34 includes a network interface 60 for connecting to network 32; an input/output interface 62 for connecting to a USB device 36, a display device 64, and/or one or more input devices 66 (such as, for example, a keyboard, keypad, mouse, trackpad, trackball, touch-sensitive device, or any similar devices); a controller 66 (such as, for example, a processor, microprocessor, central processing unit, or dedicated circuitry); and memory 68. Memory 68 may include any type of volatile or non-volatile storage, such as, random access memory, read-only memory, flash memory, magnetic storage, optical storage, or any combination thereof. Memory 68 stores a virtual machine (VM) client 70, which may be executed by controller 66. Memory 68 also stores data used by VM client 70. Memory 68 may also store other well-known elements, such as, for example, an operating system, system settings, and user data.

Figure 3:
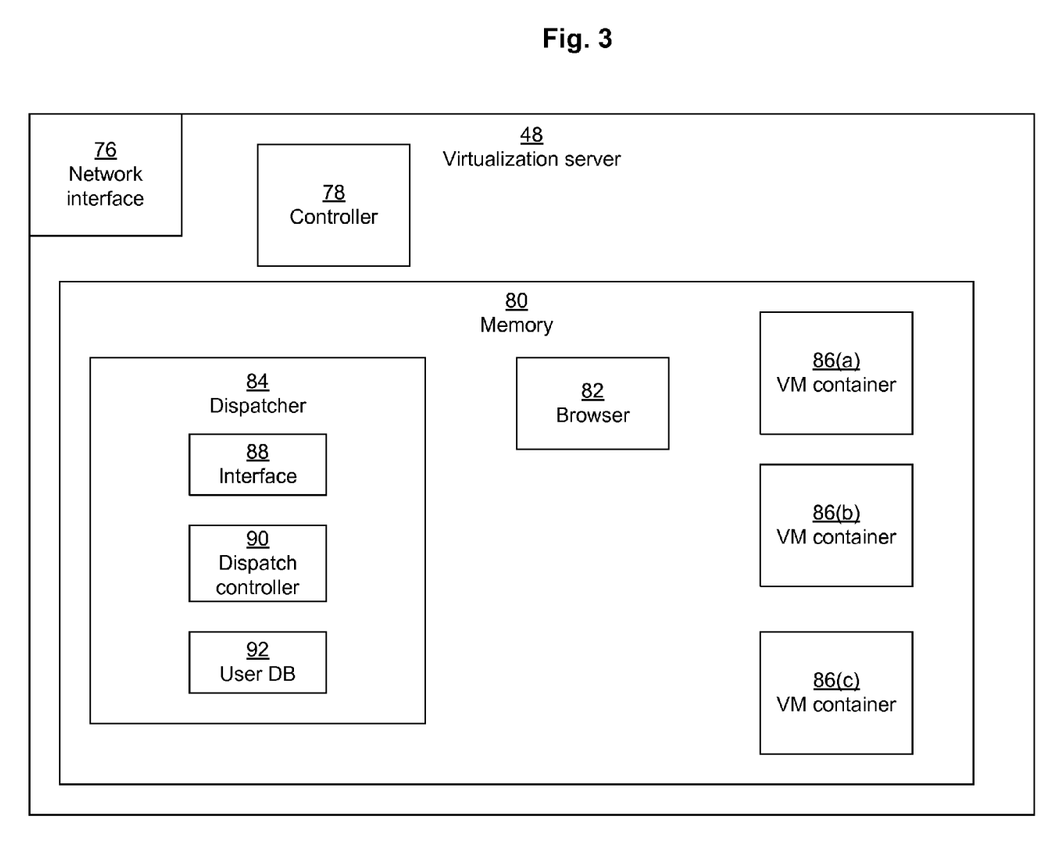
FIG. 3 illustrates an example apparatus of one embodiment.

FIG. 3 depicts a virtualization server 48 in further detail. Virtualization server 48 includes a network interface 76 for connecting to network 32, a controller 78 (such as, for example, a processor, microprocessor, central processing unit, or dedicated circuitry), and memory 80. Memory 80 may include any type of volatile or non-volatile storage, such as, random access memory, read-only memory, flash memory, magnetic storage, optical storage, or any combination thereof. Memory 80 stores a secure browser program 82, a VM dispatcher 84, and a set of VM containers 86 (depicted as VM containers 86(*a*)-86(*c*)). Each VM container 86 contains data for a virtual machine session with a CSCD 34 and may include an instance of browser 82. Memory 80 also stores other well-known elements, such as, for example, an operating system, system settings, and user data. Dispatcher 84 includes several elements, including an interface 88, a dispatch controller 90, and a user database 92.

In operation, a user wishing to process a commercial banking transaction, or otherwise engage in secured communication 50 with an application server 42 (such as a web banking server) uses a CSCD 34 to establish a secure VM session (using VM client 70) on virtualization server 48. The user is then able to run an instance of browser 82 on the virtualization server 48 (in a VM context) in order to access application server 42. Because browser 82 is secure and run on a secure environment, the user may rest assured than there is no malware running within the VM session on the virtualization server 48, thereby increasing the security of the communications 50. Further security can be ensured once data has left the virtualization server 48 for the CSCD 34, as will be described in further detail below.

In order to ensure that no malware is running within the VM client 70, various methods may be used. In some embodiments, the user is provided with a copy of the VM client 70 software on a portable USB storage device 36, which the user may then attach to his CSCD 34. In one embodiment, the USB storage device 36 may be read-only, thereby preventing the VM client software from being modified by malware. The user is then able to securely run the VM client 70 directly from the USB storage device 36.

Figure 4:
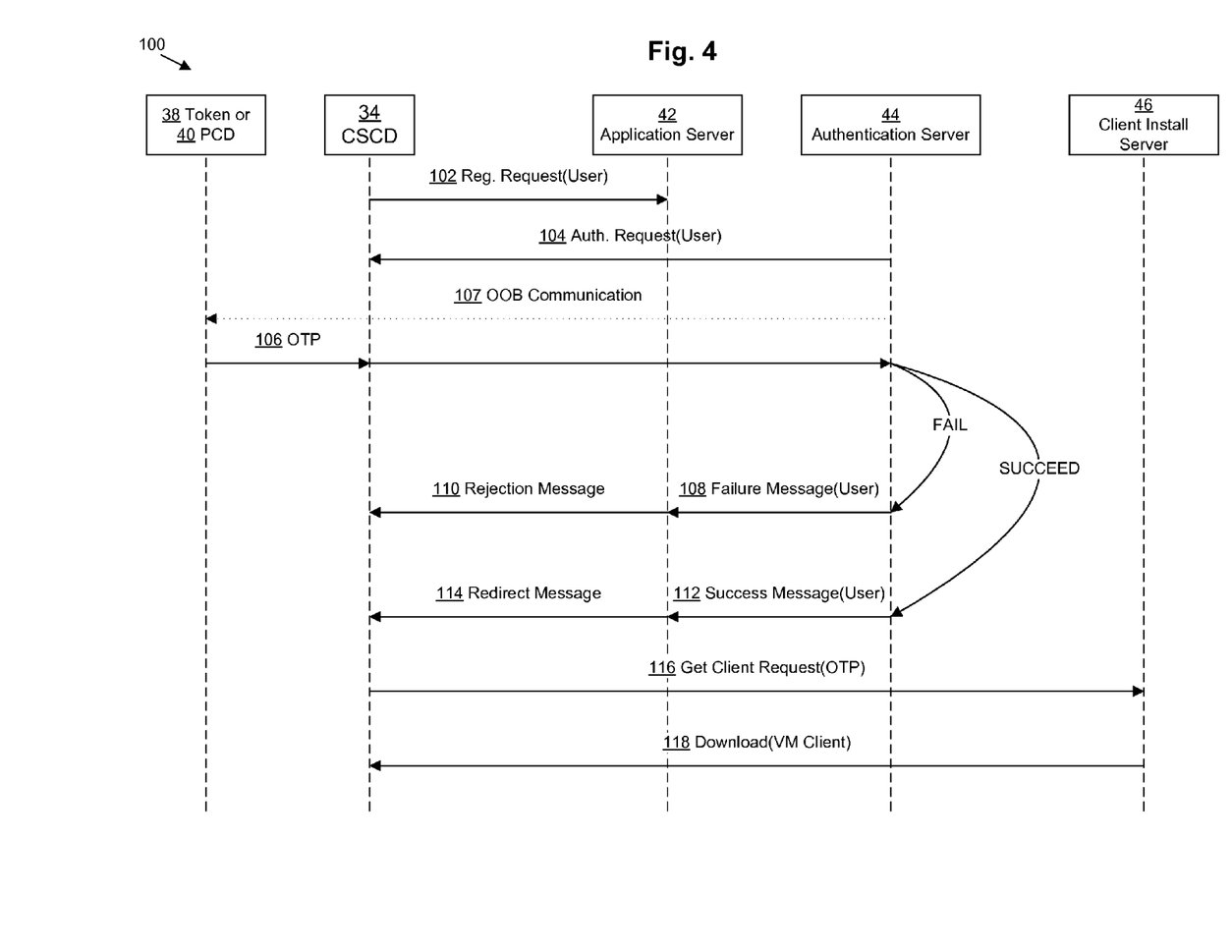
FIG. 4 illustrates an example method of one embodiment.

In other embodiments, the user downloads the VM client 70 across network 32 through a secure method 100, such as depicted in FIG. 4. In FIG. 4, the user, using CSCD 34, accesses a bank web site (e.g., using a client-side browser), such as, for example, on application server 42, and sends a registration request 102 together with a userID. The application server 42 forwards this registration request 102 to authentication server 44 (which may be a separate server, or it may be an abstraction running within the application server 42 or virtualization server 48). Authentication server 44 determines whether the user having the userID is authorized to access the application server 42 (such as, by determining if the user has an established account at the bank). Authentication server 44 also communicates with the user using a strong authentication method to ensure that the user is not masquerading by altering his identity.

In one embodiment, authentication server 44 requests a one-time password (OTP) from the CSCD 34(*c*) across network 32 by means of authentication request 104. The user then uses token 38 to generate a OTP 106, and types the OTP 106 into the CSCD 34(*c*) to send back to the authentication server 44 or to use to encrypt a return signal. Because the token 38 and the authentication server 44 use the same algorithm and secret data to generate the OTP 106 (as is well-understood in the art of tokens used for OTPs), the authentication server 44 is able to verify that the user is in possession of the correct token 38.

In another embodiment, authentication server 44 requests a one-time password (OTP) from the CSCD 34(*d*) across network 32. Authentication server 44 also sends an out-of-band (OOB) communication 107 to a portable communication device 40, such as a cellular telephone, in possession of the user. For example, authentication server 44 sends a text message or any kind of cellular-based message (e.g., using the short message service or SMS standard) to the cellular phone 40 using the wireless cellular network. By the user typing this message (or a portion thereof) into the CSCD 34(*d*), this message allows the CSCD 34(*d*) to send back a OTP 106 (or a return signal encrypted with the OTP 106) to the authentication server 44 to verify the user's identity.

If the authentication server 44 fails to authenticate the user successfully, then authentication server 44 sends a failure message 108 to application server 42, which, in turn, informs the user via rejection message 110 that the attempt has failed.

If authentication server 44 properly authenticates the user, then authentication server 44 sends a success message 112 to application server 42, which, in turn, directs the user's browser via redirect message 114 to point to client install server 46. The user is then able to download the VM client 70 from the client install server 46 by sending a Get client request 116 to the client install server 46. In return, client install server 46 sends a download 118 of the VM client 70 to the CSCD 34. In some embodiments, the OTP 106 is used again to verify the user's identity. The user is then able to install the VM client 70 in memory 68 on the CSCD 34. In some embodiments, the VM client 70 may be digitally signed to prevent alteration of the software by malware.

In one embodiment, VM client 70 is a standalone application, while in another embodiment, VM client 70 is a browser extension that the user is able to run in conjunction with a standard web browser.

Figure 5:
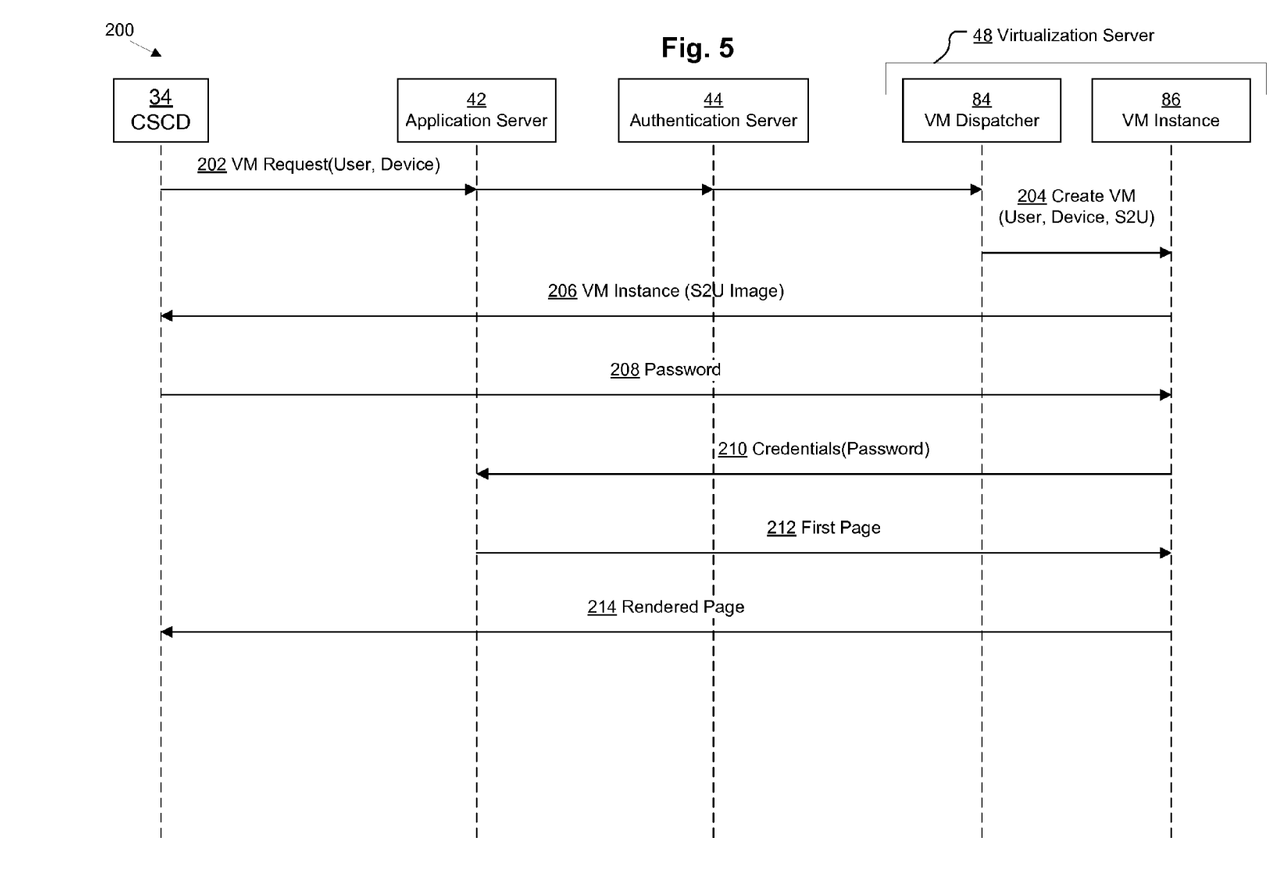
FIG. 5 illustrates an example method of one embodiment.

Once the user has successfully installed the VM client 70 on CSCD 34, user is able to use the VM client 70 to establish a VM session with virtualization server 48, according to the login method 200 depicted in FIG. 5. Upon attempting to access the application server 42, VM client 70 requests that a VM session be established by sending a VM request 202. This communication may either be made of the application server 42, the authentication server 44, or the virtualization server 48, depending on the embodiment. As depicted, CSCD 34 sends a VM request 202 to application server 42 together with the UserID, which identifies the user, and a DeviceID, which identifies the particular VM client 70. Application server 42 forwards this request to authentication server 44 (optionally together with a bank identifier). Authentication server 44 verifies that the user is entitled to access the application using the VM client 70, and then requests that virtualization server 48 establish a VM session. Preliminarily, VM dispatcher 84 is called upon to establish the session. VM dispatcher 84 makes reference to user database 92 to determine whether the user is entitled to access the virtualization server 48 with VM client 70 having the given deviceID and to determine what settings should be used to initialize the VM session. Dispatch controller 90 then creates a VM container 86 to store the VM session and sends a Create VM message to the VM Instance 86, with various details regarding the VM session. Interface 88 is then able to send the details of the VM session to the VM client 70 in a VM Instance message 206 so that the VM session can be run across network 32.

Every time a VM session is established with a particular user, the settings are initialized to the same values stored in the user database 92. This ensures that no unsecured software is permitted to run with the VM session and also ensures that no passwords or other volatile data is saved with the virtualization server 48 from session to session, thereby ensuring increased security.

Once the VM session is established, the dispatch controller 90 runs an instance of browser 82 in the context of the VM Instance 86 associated with that VM session to communicate with application server 42. Browser 82 requests that user enter an application password 208 and then forwards that password 208 to the application server 42 in a Credentials message 210. Once the application server 42 validates the password 208, the application server 42 sends an initial web page 212 to the browser 82, running within VM container 86 on virtualization server 48. The browser 82 is then able to render the initial web page 212 and send the rendered page 214 to the CSCD 34 for display to the user, as described in further detail below, with respect to FIG. 6.

Figure 6:
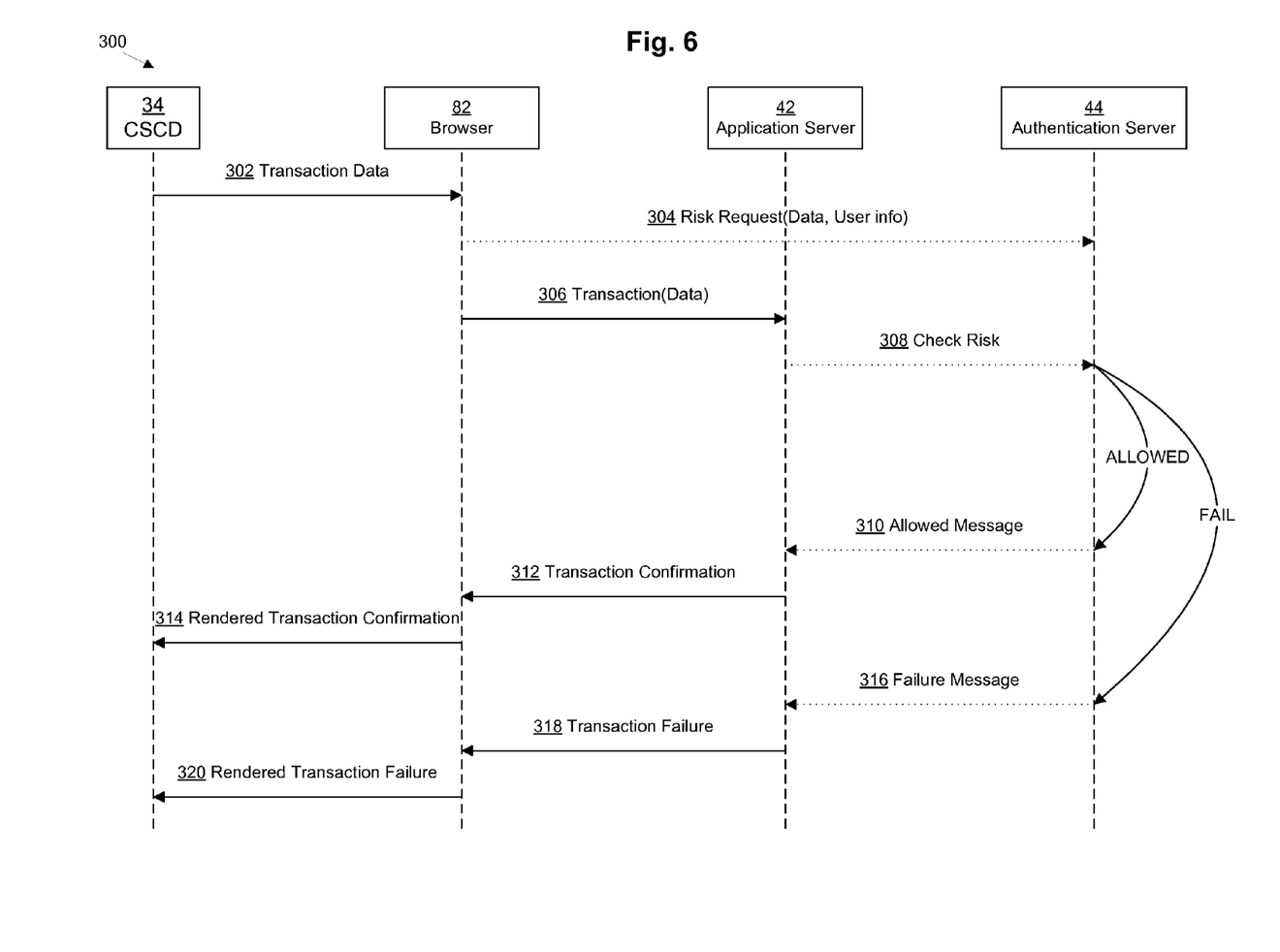
FIG. 6 illustrates an example method of one embodiment.

Once the user has properly logged in to the application server 42 using the VM client 70, the user is able to securely communicate with application server 42 via the virtualization server 48, as depicted in method 300 of FIG. 6. VM client 70 sends transaction data 302 entered by the user to the virtualization server 48 to be processed by interface 88 and browser 82, running on virtualization server 48. Browser 82 is then able to securely send transaction data 302 within a Transaction request 306 to application server 42 and then securely receive a transaction confirmation 312 back from application server 42 to securely transmit back as a rendered transaction confirmation 314 to the VM client 70 to display to the user. In some embodiments, browser 82 sends, in a Risk Request 304, data collected from the user (such as, for example, the transaction data 302 and the UserID) to authentication server 44, so that authentication server 44 can asses a risk associated with the data according to known risk-based authentication techniques. The application server 42 is then able to check, by sending message 308 to Authentication server 44, the risk associated with some or all data entered by the user before providing sensitive data back to the user. If the authentication server 44 deems the level of risk allowable, it sends an allowance message 310 back to application server 42, which allows the application server 42 to proceed to send transaction confirmation 312 to the browser 82. If, however, the authentication server 44 deems the level of risk to be too high, it sends a failure message 316 back to application server 42, which prevents the application server 42 from sending transaction confirmation 312 to the browser 82—instead, application server 42 sends a transaction failure message 318 to the browser 82, which then renders it and sends that rendered transaction failure message 320 to the VM client 70 to display to the user.

In some embodiments, browser 82 renders all web pages provided by application server 42 and sends the fully rendered images (e.g., 214, 314, 320) back to the VM client 70 running on CSCD 34. The fully rendered image may be a bitmap that represents what the web page is supposed to look like. The bitmap may be displayed to the user on screen 64 without further processing. This prevents any malware running on the CSCD 34 from modifying the web pages sent by the application server 42, since it is difficult for malware to convincingly modify a rendered page image. It also helps secure the data transmitted within the web page against eavesdropping, because it is difficult for malware to interpret data contained within a rendered page image, while it is quite easy for a human user to do so.

Data sent by the user to the application server 42 can also be further protected by using keyboard re-mapping. Thus, in one embodiment, keys on a keyboard 66 of the CSCD are mapped to different character than usual. Thus, when a user wishes to type "f," he hits the "q" key instead of the "f" key. Interface 88 of the virtualization server 48 is then able to map the "q" signal back to representing the "f" character so that the correct data can be sent to application server 42. In another embodiment, interface 88 may present the user with an on-screen keyboard (in fully-rendered form for added security), thus, when the user types "f" on the on-screen keyboard (displayed on display 64), the VM client 70 sends a "q" signal to virtualization server 48, which interface 88 is then able to translate back to an "f" character.

After the user is done with an online banking session, or any other session with application server 42, all data collected by the virtualization server 48 during the session is destroyed. Therefore, no malware can be installed on the virtualization server 48 in normal operation and no user passwords are stored on virtualization server 48. This disposable character of the virtual environment ensures the security of the virtual environment, and reduces the risk of malicious intrusion into the communications between a user and the application server 42. Thus, upon the user attempting to log back into the application server 42, a new VM session is established having the original pre-configured settings stored in the user database 92.

While various embodiments of the invention have been particularly shown and described, it will be understood by those skilled in the art that various changes in form and details may be made therein without departing from the spirit and scope of the invention as defined by the appended claims.

For example, it should be understood, that while the application server 42 and the authorization server 44 are typically under the control of an application service provider, such as a bank, the virtualization server 48 and client install server 46 may be under the control of a separate virtualization service provider. Thus, one virtualization provider may contract with multiple banks and other entities to provide virtualization services. Therefore, there may be one virtualization server 48 to service a multitude of different application servers 42, each application server 42 potentially representing a different bank or other secure entity. The application service providers are not limited to banks, but may include, for example, online gaming sites or any other sites requiring a high degree of security. In some cases, several banks will contract with a single entity to provide a single authorization server 44 for a plurality of banks.

It should be understood that the risk-based authentication performed by the authentication server 44, in some embodiments, is capable of utilizing RSA® Adaptive Authentication which is offered by EMC Corporation of Hopkinton, Mass. Certain aspects of RSA® Adaptive Authentication relate to risk-based authentication (RBA) and fraud detection which involve measuring over one hundred risk indicators to identify high-risk and suspicious activities. Certain aspects of RSA® Adaptive Authentication are powered by risk-based authentication technology that conducts a risk assessment of all users behind the scenes. A unique risk score is assigned to each activity, and users are only challenged when an activity is identified as high-risk and/or an organizational policy is violated. This transparent authentication enables organizations to increase security without compromising user convenience. Certain aspects of Adaptive Authentication monitor and authenticate activities based on risk, profiles, and policies by correlating: unique browser identification profiles, matching banking behavioral patterning profiles and inputs from our fraud intelligence teams that locate compromised IP addresses and accounts.

It should be understood that browser 82 may refer to a web browser or to any other type of program used to render and display markup files in a form suitable for viewing by humans.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

We claim:

1. A method, performed in a client-side computing device, of performing secured communications with an application server across a network, the method comprising:
   loading a virtual machine client on the client-side computing device;
   communicating with a remote virtualization server, the virtualization server being distinct from the application server, to establish an original virtual session of the virtualization server on the client-side computing device, the original virtual session being initialized to a pre-configured state upon establishment;
   performing secured communications between the client-side computing device and the application server via the original virtual session of the virtualization server, wherein performing secured communications between the client-side computing device and the application server includes:
      running a secure browser within the original virtual session of the virtualization server; and
      communicating between the client-side computing device and the application server through the secure browser;
   terminating the original virtual session;
   after terminating the original virtual session, again communicating with the remote virtualization server to establish a new virtual session of the virtualization server on the client-side computing device, the new virtual session being initialized to a pre-configured state upon establishment and the new virtual session retaining no information from the original virtual session; and
   performing additional secured communications between the client-side computing device and the application server via the new virtual session of the virtualization server.

2. A method as in claim 1 wherein performing secured communications between the client-side computing device and the application server via the original virtual session of the virtualization server further includes performing an online banking transaction.

3. A method, performed in a client-side computing device, of performing secured communications with an application server across a network, the method comprising:
   loading a virtual machine client on the client-side computing device;
   communicating with a remote virtualization server, the virtualization server being distinct from the application server, to establish a virtual session of the virtualization server on the client-side computing device, the virtual session being initialized to a pre-configured state upon establishment; and
   performing secured communications between the client-side computing device and the application server via the virtual session of the virtualization server, wherein performing secured communications between the client-side computing device and the application server includes:
      running a secure browser within the virtual session of the virtualization server; and
      communicating between the client-side computing device and the application server through the secure browser
   wherein:
   communicating with the remote virtualization server to establish the virtual session of the virtualization server on the client-side computing device includes:
      sending a request for establishment of the virtual session from the virtual machine client to the application server; and
      in response to sending the request for establishment of the virtual session, receiving, at the virtual machine client, information regarding the virtual session, the virtual session being managed by the virtualization server; and
   performing secured communications between the client-side computing device and the application server further includes logging a user into the application server via the secure browser by:
      receiving a password from the user using keystroke re-mapping between the client-side computing device and the virtualization server; and causing the secure browser to send the password to the application server for authentication.

4. A method as in claim 3 wherein performing secured communications between the client-side computing device and the application server further includes:
receiving, at the virtual machine client on the client-side computing device, communications from the application server via the virtualization server in fully rendered form, the secure browser rendering, on the virtualization server, web pages transmitted by the application server into images that can be readily interpreted by a human user, but not readily interpreted by a computer.

5. A method, performed in a client-side computing device, of performing secured communications with an application server across a network, the method comprising:
loading a virtual machine client on the client-side computing device;
communicating with a remote virtualization server, the virtualization server being distinct from the application server, to establish a virtual session of the virtualization server on the client-side computing device, the virtual session being initialized to a pre-configured state upon establishment;
performing secured communications between the client-side computing device and the application server via the virtual session of the virtualization server;
obtaining the virtual machine client at the client-side computing device, wherein obtaining the virtual machine client at the client-side computing device includes:
sending a registration request from the client-side computing device to the application server;
receiving an authentication request from an authentication server at the client-side computing device;
prompting a user to enter into the client-side computing device a one time password (OTP) from a token device, the token device being external to the client-side computing device;
sending the OTP from the client-side computing device to the authentication server; and
receiving, at the client-side computing device, the virtual machine client in response to the authentication server validating the OTP sent by the client-side computing device.

6. A method, performed in a client-side computing device, of performing secured communications with an application server across a network, the method comprising:
loading a virtual machine client on the client-side computing device;
communicating with a remote virtualization server, the virtualization server being distinct from the application server, to establish a virtual session of the virtualization server on the client-side computing device, the virtual session being initialized to a pre-configured state upon establishment;
performing secured communications between the client-side computing device and the application server via the virtual session of the virtualization server; and
obtaining the virtual machine client at the client-side computing device, wherein obtaining the virtual machine client at the client-side computing device includes:
sending a registration request from the client-side computing device to the application server across a first communication channel;
receiving an authentication request from an authentication server at the client-side computing device across the first communication channel;
prompting a user to enter into the client-side computing device a one time password (OTP) from a portable communication device, the portable communication device (PCD) being external to the client-side computing device, the OTP being received by the PCD from the authentication server across a second communication channel, the second communication channel being distinct from the first communication channel;
sending the OTP from the client-side computing device to the authentication server across the first communication channel; and
receiving, at the client-side computing device, the virtual machine client in response to the authentication server validating the OTP sent by the client-side computing device.

7. A method as in claim 6 wherein:
the PCD is a cellular telephone;
the second communication channel is a wireless cellular communication channel; and
the PCD receives the OTP over the second communication channel via a short message service message.

8. A computer program product comprising a tangible non-transitory computer-readable medium storing instructions, which, when performed by a computer, cause the computer to:
communicate with a remote virtualization server, the virtualization server being distinct from the computer, to establish a virtual session of the virtualization server on the computer, the virtual session being initialized to a pre-configured state upon establishment; and
perform secured communications between the computer and an application server via the virtual session of the virtualization server;
wherein the instructions, when causing the computer to:
perform secured communications between the computer and the application server, cause the computer to:
run a secure browser within the virtual session of the virtualization server; and
communicate between the computer and the application server through the secure browser;
communicate with the remote virtualization server to establish the virtual session of the virtualization server on the computer, cause the computer to:
send a request for establishment of the virtual session from the virtual machine client to the application server; and
in response to sending the request for the virtual session, receive, at the virtual machine client, information regarding the virtual session, the virtual session being managed by the virtualization server; and
perform secured communications between the computer and the application server, further cause the computer to log a user into the application server via the secure browser by:
receiving a password from the user using keystroke re-mapping between the computer and the virtualization server; and
causing the secure browser to send the password to the application server for authentication.

9. A computer program product as in claim 8 wherein the instructions, when causing the computer to perform secured communications between the computer and the application server, further cause the computer to:
receive, at the virtual machine client on the computer, communications from the application server via the virtualization server in fully rendered form, the secure browser rendering, on the virtualization server, web pages transmitted by the application server into images that can be readily-interpreted by a human user, but not readily-interpreted by the computer.

10. A computer program product as in claim 8 wherein the instructions, when causing the computer to perform secured communications between the computer and the application server via the virtual session of the virtualization server, further cause the computer to perform an online banking transaction.

11. A computer program product as in claim 8 wherein:
the virtual session is an original virtual session; and
the instructions, when performed by the computer, further cause the computer to:
  terminate the original virtual session;
  after terminating the original virtual session, again communicate with the remote virtualization server to establish a new virtual session of the virtualization server on the client-side computing device, the new virtual session being initialized to a pre-configured state upon establishment and the new virtual session retaining no information from the original virtual session; and
  perform additional secured communications between the client-side computing device and the application server via the new virtual session of the virtualization server.

12. A method, performed in a virtualization server, of facilitating secured communications between a client-side computing device and an application server across a network, the method comprising:
  receiving, at the virtualization server, a request to establish a virtual session;
  in response to receiving the request, dispatching a virtual machine instance on the virtualization server;
  in response to dispatching the virtual machine instance, initializing the virtual session to a pre-configured state;
  sending, across the network, information regarding the virtual machine instance to a virtual machine client running on the client-side computing device;
  via the virtual session, receiving secure communications from the client-side computing device and securely forwarding these communications to the application server;
  via the virtual session, receiving secure communications from the application server and securely forwarding these communications to the client-side computing device; and
  upon completion of communication between the client-side computing device and the application server, destroying the virtual machine instance without maintaining state information regarding the virtual machine instance.

13. A method as in claim 12 wherein receiving secure communications from the application server and securely forwarding these communications to the client-side computing device includes:
  rendering, on the virtualization server, web pages transmitted by the application server into rendered images that can be readily interpreted by a human user, but not readily interpreted by a computer; and
  sending the rendered images to the client-side computing device.

14. A method as in claim 12 wherein receiving secure communications from the client-side computing device and securely forwarding these communications to the application server includes:
  receiving, at the virtualization server, an indication that a user has pressed a certain key on the client-side compting device;
  mapping, at the virtualization server, the certain key to a translated character not ordinarily represented by the certain key; and
  sending the translated character from the virtualization server to the application server.

15. A method as in claim 12 wherein the secured communications between the client-side computing device and the application server include an online banking transaction.

* * * * *